(12) United States Patent
Huang et al.

(10) Patent No.: US 11,102,217 B2
(45) Date of Patent: Aug. 24, 2021

(54) METHOD AND SYSTEM FOR CONFIRMING E-MAIL AUTHENTICITY AND NON-TRANSITORY STORAGE MEDIUM THEREOF

(71) Applicant: Block Chain Security Corp., Taipei (TW)

(72) Inventors: Chin-Po Huang, Taipei (TW); Chih-Tung Yu, Taipei (TW); Chi-Heng Hung, Taipei (TW)

(73) Assignee: BLOCK CHAIN SECURITY CORP., Taipei (TW)

( * ) Notice: Subject to any disclaimer, the term of this patent is extended or adjusted under 35 U.S.C. 154(b) by 104 days.

(21) Appl. No.: 16/657,424

(22) Filed: Oct. 18, 2019

(65) Prior Publication Data

US 2021/0037022 A1    Feb. 4, 2021

(30) Foreign Application Priority Data

Jul. 30, 2019  (TW) ................................. 108127083

(51) Int. Cl.
  *H04L 29/06* (2006.01)
  *H04L 12/58* (2006.01)
  *G06F 40/30* (2020.01)

(52) U.S. Cl.
  CPC ............ *H04L 63/123* (2013.01); *G06F 40/30* (2020.01); *H04L 51/02* (2013.01); *H04L 51/22* (2013.01)

(58) Field of Classification Search
  CPC ....... H04L 63/123; H04L 51/02; H04L 51/22; G06F 40/30; G06Q 10/107
  See application file for complete search history.

(56) References Cited

U.S. PATENT DOCUMENTS

| 10,305,833 | B1 | 5/2019 | Dennis | |
|---|---|---|---|---|
| 2013/0191646 | A1* | 7/2013 | Haddad | H04L 9/12 713/176 |
| 2017/0359288 | A1* | 12/2017 | Golan | G06F 16/2379 |

FOREIGN PATENT DOCUMENTS

| CN | 104994008 A | 10/2015 |
|---|---|---|
| CN | 108092874 A | 5/2018 |
| CN | 109831374 A | 5/2019 |
| EP | 3206364 A1 | 8/2017 |
| TW | 200926064 A | 6/2009 |
| TW | M587314 U | 12/2019 |

\* cited by examiner

*Primary Examiner* — Soe Hlaing

(74) *Attorney, Agent, or Firm* — Birch, Stewart, Kolasch & Birch LLP

(57) ABSTRACT

A method and a system for confirming e-mail authenticity and a non-transitory storage medium thereof are provided. A sender electronic device produces a data fingerprint based on mail content of an e-mail, inserts the data fingerprint into the e-mail, and transmits the data fingerprint and the mail content to a data storage device to be stored. A receiver electronic device obtains the data fingerprint from the e-mail and acquires, based on the data fingerprint, the corresponding mail content from the data storage device. If the corresponding mail content is not stored in the data storage device or the acquired mail content does not accord with the mail content of the received e-mail, the receiver electronic device marks the e-mail as counterfeit.

7 Claims, 8 Drawing Sheets

| | Current mail | Blockchain attestation mail |
|---|---|---|
| ⊗ Mail blockchain hash | ░░░░░░░░░░░░░░░░░░░ | ░░░░░░░░░░░░░░░░░░░ |
| ⊗ Time | ░░░░░░░░ | ░░░░░░░░ |
| ⊗ Sender | ░░░░░░░ | ░░░░░░░ |
| ► Recipient | xxxx@gmail.com, green@gmail.com | xxxx@gmail.com, green@gmail.com |
| ⊗ Mail content | I am glad we have reached a consensus on the matter of agency in the past four months. Enclosed is our contract No. 278 in duplicate. Please sign them and send it back to us for archiving. Please review all the terms of the contract to see if there are discrepancies in the terms we have agreed on. Can you please speed up the signing of the contract and give it to us next Friday? Your attention to this matter will be greatly appreciated. Jim | I am glad we have reached a consensus on the matter of agency in the past four months. Enclosed is our contract No. 278 in duplicate. Please sign them and send it back to us for archiving. Please review all the terms of the contract to see if there are discrepancies in the terms we have agreed on. Can you please speed up the signing of the contract and give it to us next Friday? Your attention to this matter will be greatly appreciated. Jim |
| ⊗ Mail attachment | Cooperation contract.pdf | Cooperation contract.pdf |

FIG. 7

METHOD AND SYSTEM FOR CONFIRMING E-MAIL AUTHENTICITY AND NON-TRANSITORY STORAGE MEDIUM THEREOF

CROSS-REFERENCE TO RELATED APPLICATION

This non-provisional application claims priority under 35 U.S.C. § 119(a) to Patent Application No. 108127083 filed in Taiwan, R.O.C. on Jul. 30, 2019, the entire contents of which are hereby incorporated by reference.

BACKGROUND

Technical Field

The present invention relates to a technology for confirming e-mail authenticity, and in particular, to a method and a system for confirming e-mail authenticity and a non-transitory storage medium thereof, to attest an e-mail as soon as a sender sends the e-mail.

Related Art

In modern times, people usually communicate with each other on the internet. Especially, e-mails are widely used for business communication. Therefore, a malicious person may counterfeit mail content of an e-mail or may hack into an e-mail server (SMTP server) of a sender, a routing process or a receiver to intercept and tamper with mail content to defraud a user of sensitive information (such as a password, and credit card information) or even a remittance.

SUMMARY

In view of this, an embodiment of the present invention provides a method for confirming e-mail authenticity, including: performing an attestation procedure on an e-mail at a sender point, then sending the e-mail to a receiver point, and finally performing an authenticity verification procedure when the receiver point receives the e-mail. The attestation procedure includes: producing a data fingerprint based on mail content of the e-mail; inserting the data fingerprint into the e-mail; and transmitting the data fingerprint and the mail content to a data storage device to be stored. The authenticity verification procedure includes: obtaining the data fingerprint from the e-mail; acquiring, based on the data fingerprint, the corresponding mail content from the data storage device; and marking the e-mail as counterfeit if the corresponding mail content is not stored in the data storage device or the acquired mail content does not accord with the mail content of the received e-mail. An attestation mechanism at the sender point and an authenticity verification mechanism at the receiver point are used to reveal any e-mail being counterfeited and ensure e-mail authenticity.

An embodiment of the present invention provides a non-transitory storage medium enabling an electronic device to perform e-mail attestation and authenticity verification steps. An electronic device is disposed at both a sender point and a receiver point. The electronic device at the sender point sends an e-mail to the electronic device at the receiver point. The electronic device at the receiver point opens the e-mail. The e-mail attestation and authenticity verification steps are performed when the sender sends the e-mail and the receiver point opens the e-mail. The e-mail attestation and authenticity verification steps include: performing an attestation procedure on the e-mail at the sender point, then sending the e-mail to the receiver, and performing an authenticity verification procedure when the receiver point receives the e-mail. The attestation procedure includes: producing a data fingerprint based on mail content of the e-mail; inserting the data fingerprint into the e-mail; and transmitting the data fingerprint and the mail content to a data storage device to be stored. The authenticity verification procedure includes: obtaining the data fingerprint from the e-mail; acquiring, based on the data fingerprint, the corresponding mail content from the data storage device; and marking the e-mail as counterfeit if the corresponding mail content is not stored in the data storage device or the acquired mail content does not accord with the mail content of the received e-mail.

An embodiment of the present invention provides an e-mail attestation method, including: producing a data fingerprint based on mail content of an e-mail; inserting the data fingerprint into the e-mail; transmitting the data fingerprint and the mail content to a data storage device to be stored; and sending the e-mail.

An embodiment of the present invention provides a method for verifying e-mail authenticity, including: receiving an e-mail; obtaining a data fingerprint from the e-mail; acquiring, based on the data fingerprint, corresponding mail content from a data storage device; and marking the e-mail as counterfeit if the corresponding mail content is not stored in the data storage device or the acquired mail content does not accord with the mail content of the received e-mail.

An embodiment of the present invention provides a system for confirming e-mail authenticity, including: a data storage device, a sender electronic device, and a receiver electronic device. The sender electronic device produces a data fingerprint based on mail content of an e-mail, inserts the data fingerprint into the e-mail, and transmits the data fingerprint and the mail content to the data storage device to be stored. The receiver electronic device obtains the data fingerprint from the e-mail, acquires, based on the data fingerprint, the corresponding mail content from the data storage device, and marks the e-mail as counterfeit if the corresponding mail content is not stored in the data storage device or the acquired mail content does not accord with the mail content of the received e-mail.

An embodiment of the present invention provides an attestation electronic device, performing the foregoing e-mail attestation method.

An embodiment of the present invention provides an authenticity verification electronic device, performing the foregoing method for verifying e-mail authenticity.

In some embodiments, the mail content is a mail body.

In some embodiments, the mail content further includes a header.

In some embodiments, the data storage device is a blockchain system.

In some embodiments, the attestation procedure further includes: taking a screenshot of an edit mail window of the e-mail to acquire an edit mail window image including at least part of the mail content; and transmitting the edit mail window image to the data storage device to be stored. The authenticity verification procedure further includes: acquiring, based on the data fingerprint, the corresponding edit mail window image from the data storage device; and displaying the edit mail window image acquired from the data storage device.

In some embodiments, the authenticity verification procedure further includes: performing text recognition on the edit mail window image acquired from the data storage device; and comparing any recognized text with the mail content of the e-mail, and marking the e-mail as counterfeit if the recognized text does not accord with the mail content.

Based on the above, by means of the method and system for confirming e-mail authenticity and the non-transitory storage medium thereof provided in the embodiments of the present invention, an e-mail may be attested as soon as a sender sends the e-mail, so that the receiver point can verify the authenticity of the received e-mail.

BRIEF DESCRIPTION OF THE DRAWINGS

FIG. 7 is a schematic diagram of marking a difference between mail content stored in a data storage device and mail content of a received e-mail according to an embodiment of the present invention.

DETAILED DESCRIPTION

Figure 1:
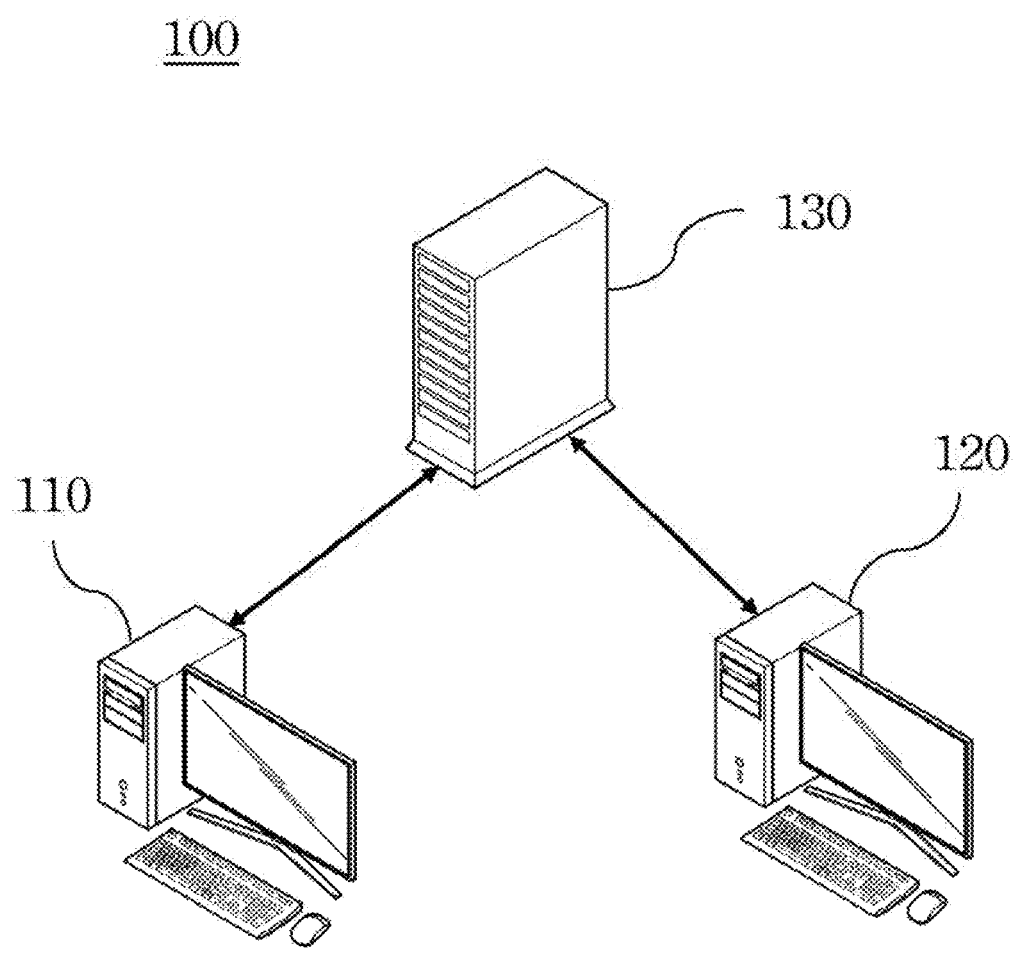
FIG. 1 is a schematic architectural diagram of a system for confirming e-mail authenticity according to an embodiment of the present invention.

FIG. 1 is a schematic architectural diagram of a system, 100, for confirming e-mail authenticity according to an embodiment of the present invention. The system 100 for confirming e-mail authenticity includes: a sender electronic device, 110 (or referred to as "an attestation electronic device"), a receiver electronic device, 120 (or referred to as "an authenticity verification electronic device"), and a data storage device, 130. In some embodiments, the data storage device 130 is a database host and may be implemented by a single host or by a regional or distributed computer cluster. In some embodiments, the data storage device 130 is a blockchain system. A tamper-proof characteristic of the blockchain system may be used to ensure the authenticity of data stored in the blockchain. The sender electronic device 110 and the receiver electronic device 120 may be implemented by a computing device, for example, a smartphone, a tablet computer, a notebook computer, a desktop computer, that has a networking capability of receiving e-mails. In this case, the sender electronic device 110 and the receiver electronic device 120 may access data in the data storage device 130 through the network.

Figure 2:
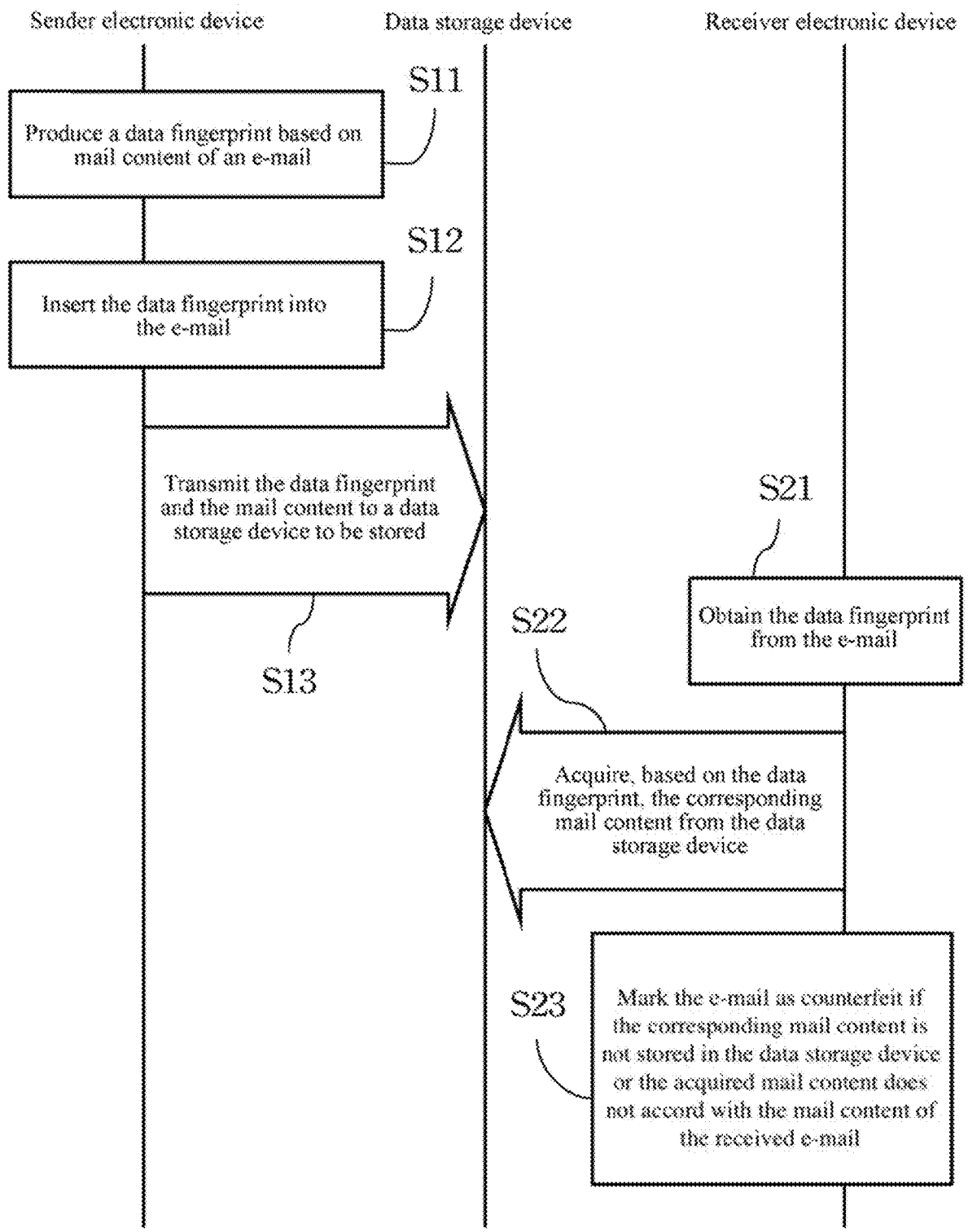
FIG. 2 is a flowchart of a method for confirming e-mail authenticity according to an embodiment of the present invention.

FIG. 2 is a flowchart of a method for confirming e-mail authenticity according to an embodiment of the present invention. At a sender point, the sender electronic device 110 performs an attestation procedure on an e-mail and then sends the e-mail to a receiver. At the receiver point, when receiving the e-mail, the receiver electronic device 120 performs an authenticity verification procedure to verify the authenticity of the e-mail. The attestation procedure includes step S11 to step S13, and the authenticity verification procedure includes step S21 to step S23.

First, the sender electronic device 110 produces a data fingerprint based on mail content of an e-mail (step S11). The data fingerprint may be produced by a hash algorithm such as MD5, SHA-1, and SHA-256. The hash algorithm is an irreversible data conversion manner. Different data is converted into different results. Therefore, the data fingerprint may be used as an index value representing the e-mail. Generally speaking, an e-mail includes an envelope and a content. The content includes a header and a body. The envelope includes a message reserved for an e-mail server and is not provided to a user to browse. The header includes From, To, Time, and Subject fields. The body usually refers to a mail text intended for a recipient to read. In some embodiments, the body further includes one or more attachment files.

In some embodiments, producing a data fingerprint based on mail content of an e-mail implies producing the data fingerprint by using the body. Producing the data fingerprint by using the body entails performing the hash algorithm by selectively using all or part of the content of the body. For example, only the mail text could be used to perform the hash algorithm; only the attachment file could be used to perform the hash algorithm; or, only a part (for example, first 10 lines of the text) of the mail text could be used to perform the hash algorithm.

In some embodiments, when the attachment file is used to perform the hash algorithm, a file name of the attachment file may be used to produce the data fingerprint; or the entire attachment file may be used to produce the data fingerprint.

In some embodiments, during the production of the data fingerprint based on mail content of the e-mail, in addition to the body, the header is further combined to produce the data fingerprint. When the header is combined to produce the data fingerprint, all or part of the content of the header is selectively used together with the mail content to produce the data fingerprint. In other words, the mail content based on which the data fingerprint is produced includes the header in addition to the body.

Figure 3:
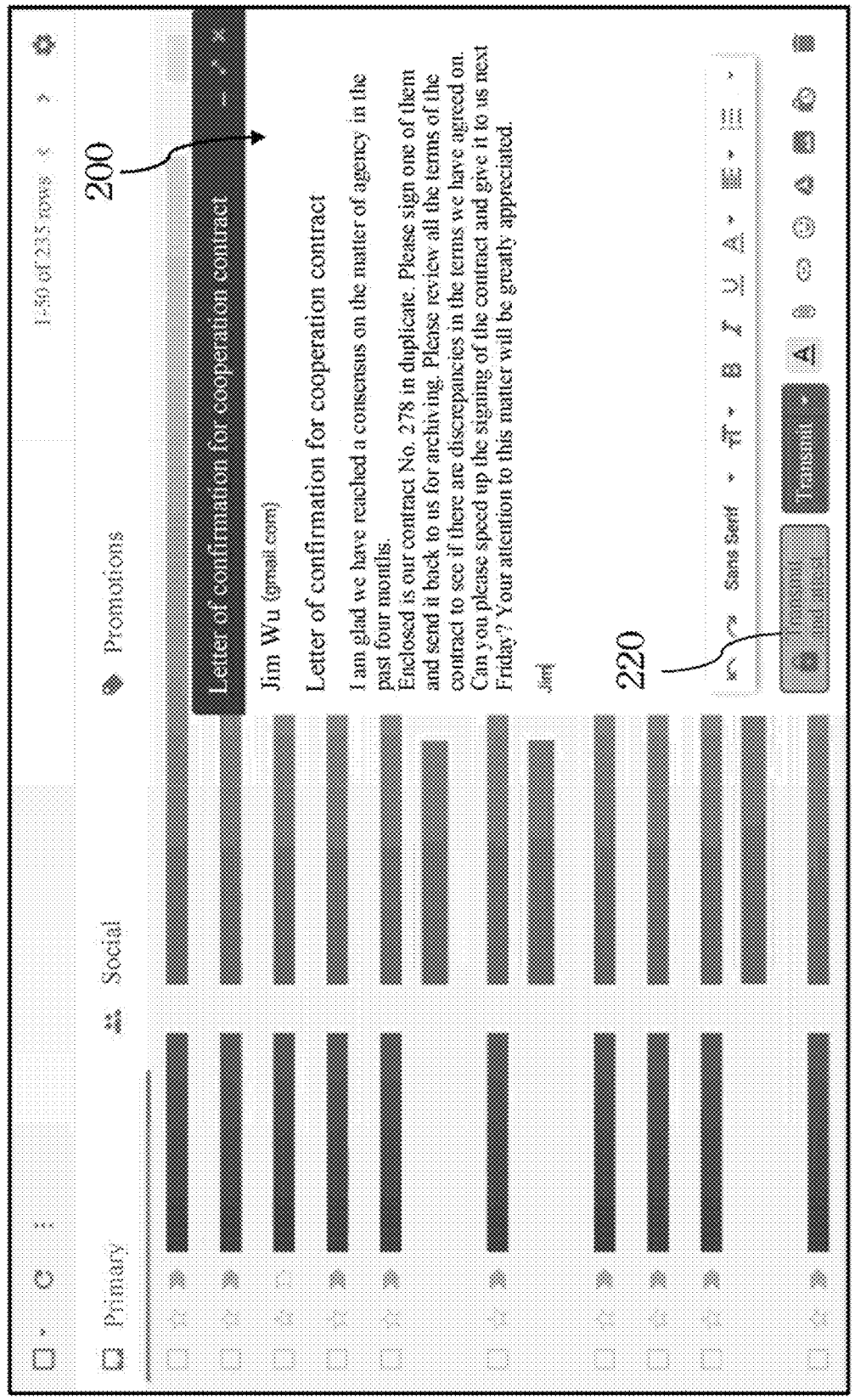
FIG. 3 is a schematic diagram of an edit mail window of a sender according to an embodiment of the present invention.
Figure 4:
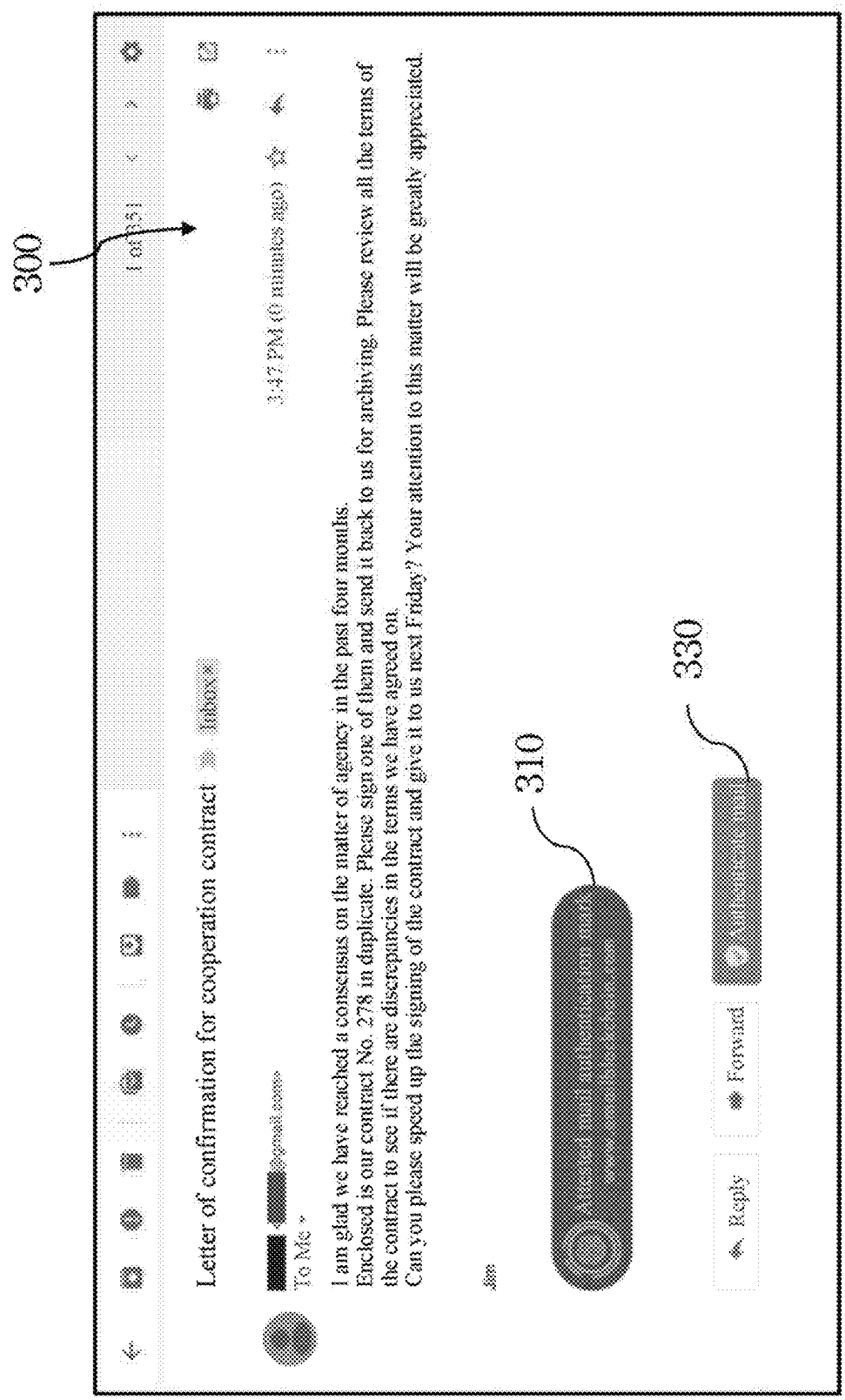
FIG. 4 is a schematic diagram of a browse mail window of a receiver point according to an embodiment of the present invention.

In step S12, the sender electronic device 110 inserts the data fingerprint into the e-mail. In some embodiments, as shown in FIG. 4, the data fingerprint may be stored in metadata of an image file, 310; and then the image file 310 is inserted into the text of the e-mail, to prevent the data fingerprint from being tampered with. Here, when step S12 is performed, the e-mail is sent synchronously. FIG. 3 is a schematic diagram of an edit mail window, 200, of a sender according to an embodiment of the present invention. The edit mail window 200 has a "Transmit and attest" button, 220. After a sender clicks the "Transmit and attest" button 220, the data fingerprint is produced and inserted into the e-mail before the e-mail is sent. Therefore, the data fingerprint does not appear in the edit mail window 200, to prevent the data fingerprint from being tampered with.

In some embodiments, the mail content may be combined with another parameter; and then the data fingerprint is produced by using the hash algorithm. For example, the other parameter may be a serial number (for example, a serial number or an IMEI number of a mobile phone) or another identifier of a sending device. In this case, if an e-mail with the same mail content is sent, different data fingerprints may still be produced.

In step S13, the sender electronic device 110 transmits the data fingerprint and the mail content used to produce the data fingerprint, both to the data storage device 130 to be stored.

In some embodiments, the order of step S12 and step S13 are interchangeable.

In some embodiments, the step of sending the e-mail may be performed before step S13.

In some embodiments, the step of sending the e-mail may be performed after step S13.

In some embodiments, as shown in FIG. 4, a browse mail window, 300, includes an "Authenticate mail" button, 330. After a recipient clicks the "Authenticate mail" button 330, step S21 to step S23 may be performed. In some embodiments, step S21 to step S23 may be automatically performed by e-mail software.

After the receiver electronic device 120 receives the e-mail, the data fingerprint may be obtained from the e-mail (step S21). For example, the data fingerprint is read from the metadata of the image file 310 of the e-mail.

In step S22, the receiver electronic device 120 searches the data storage device 130 based on the obtained data fingerprint in order to acquire the corresponding mail content. Then, if the data storage device 130 finds, based on the data fingerprint, the corresponding mail content, the mail content is transmitted to the receiver electronic device 120. If the corresponding mail content is not found, an error message is returned to the receiver electronic device 120.

In step S23, if the corresponding mail content is not stored in the data storage device 130 (that is, the receiver electronic device 120 receives the error message returned by the data storage device 130), this then represents that the data fingerprint of the received e-mail is different from the data fingerprint of the e-mail sent by the sender. If the receiver electronic device 120 receives the mail content transmitted by the data storage device 130, it represents that the data fingerprint of the received e-mail is correct and the sender did send the e-mail. Then, the receiver electronic device 120 may compare the mail content transmitted by the data storage device 130 with the mail content of the received e-mail. If the mail content acquired from the data storage device 130 does not accord with the mail content of the received e-mail, this then represents that the mail content of the received e-mail has been tampered with. In some embodiments, while performing a comparison of the mail content, a text of the mail content acquired from the data storage device 130 is compared with a text of the mail content of the received e-mail. In some embodiments, while performing the comparison of the mail content, the data fingerprint may be calculated based on the mail content of the received e-mail (exclude the image file 310) and by using a hash algorithm same as that of the sender; the data fingerprint is then compared with the data fingerprint in the data storage device 130. In some embodiments, in addition to comparison of the data fingerprints, other information such as a text of all or part of the mail content may also be compared. Therefore, if the corresponding mail content is not stored in the data storage device 130, or the mail content acquired from the data storage device 130 does not accord with the mail content of the received e-mail, the receiver electronic device 120 marks the e-mail as counterfeit. In contrast, if the mail content acquired from the data storage device 130 accords with the mail content of the received e-mail, it may be confirmed that the received e-mail is the same as the e-mail sent by the sender; the receiver electronic device 120 then marks the e-mail as authentic.

The attestation electronic device according to the embodiments of the present invention is an electronic device capable of performing the foregoing step S11 to step S13. The authentication electronic device according to the embodiments of the present invention is an electronic device capable of performing the foregoing step S21 to step S23.

In some embodiments, the sender electronic device 110 does not perform the foregoing step S11 to step S13; another attestation electronic device (such as a router, a gateway and a server) is used, in place, to perform the attestation. Specifically, the sender electronic device 110 transmits the corresponding mail content to the attestation electronic device (for example, the e-mail is forwarded to the attestation electronic device or the e-mail passes through the attestation electronic device before reaching the e-mail server). After receiving the mail content, the attestation electronic device performs the foregoing step S11 to step S13, to transmit the mail content and the corresponding data fingerprint to the data storage device 130 to be stored.

In some embodiments, the foregoing step S21 to step S23 are not performed by the receiver electronic device 120; another authentication electronic device (such as a router, a gateway and a server) is used, in place, to confirm whether the mail content stored in the data storage device 130 accords with the mail content of the e-mail received by the receiver electronic device 120. That is, the receiver electronic device 120 and the authenticity verification electronic device may jointly perform the foregoing authenticity verification procedure. Specifically, the receiver electronic device 120 transmits the data fingerprint and the corresponding mail content to the authenticity verification electronic device (for example, forwards the e-mail to the authenticity verification electronic device). The authenticity verification electronic device acquires, based on the foregoing step S22, the corresponding mail content stored in the data storage device 130; it further confirms whether the corresponding mail content stored in the data storage device 130 accords with the mail content of the e-mail received by the receiver electronic device 120. If the corresponding mail content is not stored in the data storage device 130 or the mail content acquired from the data storage device 130 does not accord with the mail content of the received e-mail, the receiver electronic device 120 is instructed to mark the e-mail as counterfeit.

Figure 5:
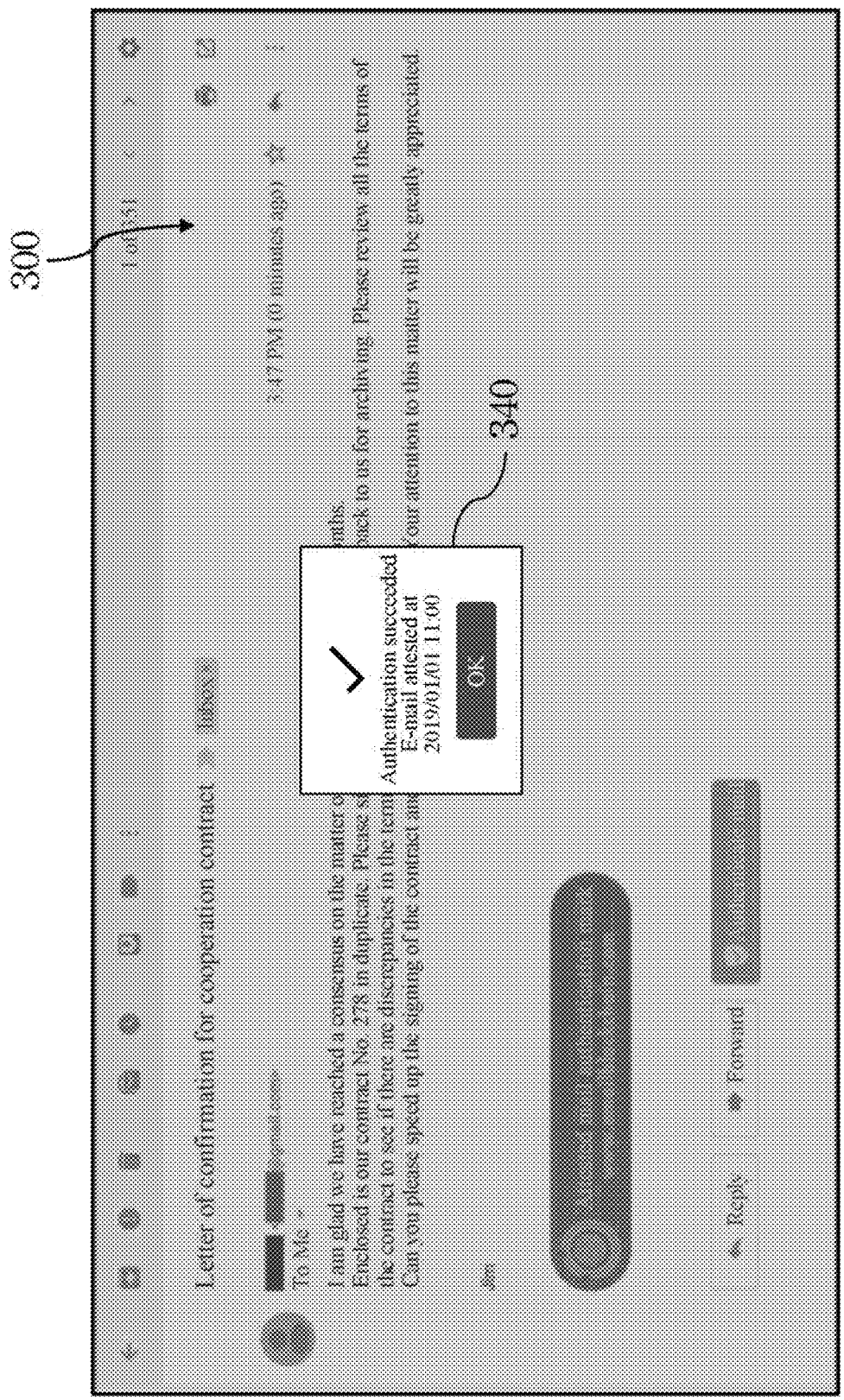
FIG. 5 is a schematic diagram of marking an e-mail as authentic according to an embodiment of the present invention.
Figure 6:
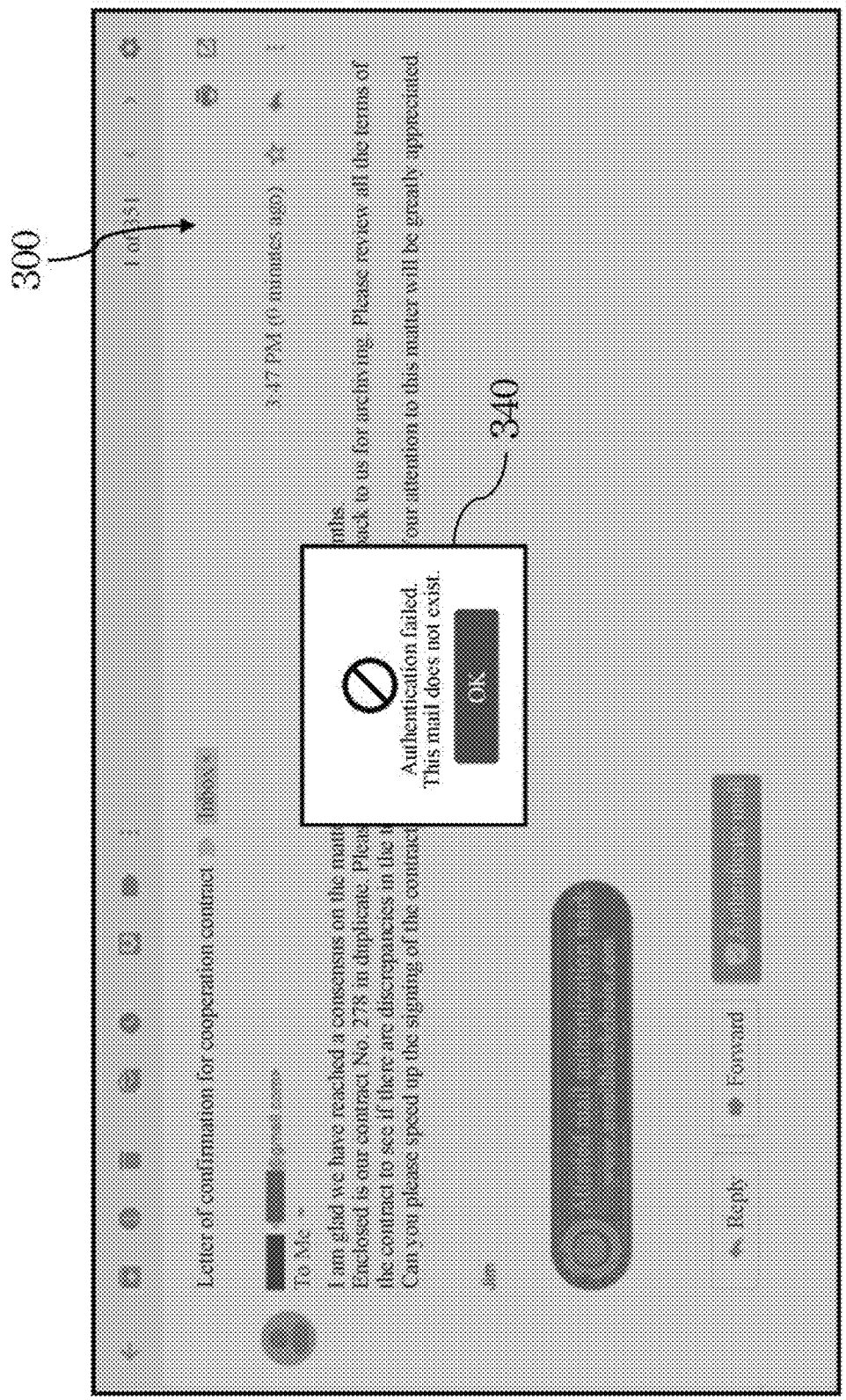
FIG. 6 is a schematic diagram of marking an e-mail as counterfeit according to an embodiment of the present invention.

In some embodiments, the receiver electronic device 120 may display a pop-up window, 340, to display an authenticity verification result. FIG. 5 is a schematic diagram of marking an e-mail as authentic according to an embodiment of the present invention. FIG. 6 is a schematic diagram of marking an e-mail as counterfeit according to an embodiment of the present invention.

FIG. 7 is a schematic diagram of marking a difference between mail content stored in the data storage device 130 and mail content of a received e-mail according to an embodiment of the present invention. As shown in FIG. 7, the receiver electronic device 120 may display both the mail content (and the corresponding data fingerprint) acquired from the data storage device 130 and the mail content (and the corresponding data fingerprint) of the received e-mail; it may also mark the difference in a manner (for example, a highlighted manner) noticeable to the recipient.

Figure 8:
FIG. 8 is a schematic diagram of an edit mail window image of a sender displayed at a receiver point according to an embodiment of the present invention.

FIG. 8 is a schematic diagram of an edit mail window image, 350, of a sender displayed at the receiver point according to an embodiment of the present invention. In some embodiments, an attestation procedure performed by the sender electronic device 110 may further include: taking a screenshot of the edit mail window of the e-mail to acquire an edit mail window image 350 including at least part of the mail content; and also transmitting the mail edit window image 350 to the data storage device 130 to be stored. Correspondingly, the authenticity verification procedure performed by the receiver electronic device 120 may further include: acquiring, based on the data fingerprint, the corresponding email edit window image 350 from the data storage device 130; and also displaying the edit mail window image 350 acquired from the data storage device 130. In this case, the recipient may compare the mail content of the received e-mail with the edit mail window image 350, in order to identify whether the received e-mail is tampered with.

In some embodiments, the receiver electronic device 120 may further perform text recognition on the editing window image 350, and compare a recognized text with the mail content of the e-mail; it then may mark the e-mail as counterfeit if the recognized text does not accord with the mail content.

A non-transitory storage medium is installed on each of the sender electronic device 110 and the receiver electronic device 120; it includes a computer executable program, in order to perform the foregoing attestation procedure and authenticity verification procedure. The computer executable program may be, for example, a mail "receiving and sending" application, an extension kit of the mail "receiving and sending" application, or an extension kit used to send and receive online mails on a browser.

In some embodiments, instead of a display manner, a sound manner, a vibration manner or the like may be used to make a mark. Alternatively, a mark (for example, a flag) is inserted in a data packet or an e-mail.

In some embodiments, the computer executable program included in the non-transitory storage medium includes part of the program code for performing the foregoing attestation procedure; yet it does not include part of program code for performing the foregoing authenticity verification procedure.

In some embodiments, the computer executable program included in the non-transitory storage medium includes part of the program code for performing the foregoing authenticity verification procedure; yet it does not include part of program code for performing the foregoing attestation procedure.

In some embodiments, the computer executable program included in the non-transitory storage medium includes part of the program code for performing the foregoing attestation procedure and authenticity verification procedure.

Based on the above, by means of the method and system for confirming e-mail authenticity and the non-transitory storage medium thereof provided in the embodiments of the present invention, an e-mail may be attested as soon as a sender sends the e-mail; this allows the receiver point to verify the authenticity of the received e-mail.

What is claimed is:

1. A method for confirming e-mail authenticity, comprising:
    performing an attestation procedure on an e-mail at a sender point and then sending the e-mail to a receiver point, the attestation procedure comprising:
        producing a data fingerprint based on mail content of the e-mail;
        inserting the data fingerprint into the e-mail;
        transmitting the data fingerprint and the mail content to a data storage device to be stored;
        taking a screenshot of an edit mail window of the e-mail to acquire an edit mail window image comprising at least part of the mail content; and
        transmitting the edit mail window image to the data storage device to be stored; and
    performing an authenticity verification procedure when the receiver point receives the e-mail, the authenticity verification procedure comprising:
        obtaining the data fingerprint from the e-mail;
        acquiring, based on the data fingerprint, the corresponding mail content from the data storage device;
        marking the e-mail as counterfeit if the corresponding mail content is not stored in the data storage device or the acquired mail content does not accord with the mail content of the received e-mail;
        acquiring, based on the data fingerprint, the corresponding edit mail window image from the data storage device; and
        displaying the edit mail window image acquired from the data storage device.

2. The method for confirming e-mail authenticity according to claim 1, wherein the mail content is a body.

3. The method for confirming e-mail authenticity according to claim 1, wherein the mail content further comprises a header.

4. The method for confirming e-mail authenticity according to claim 1, wherein the data storage device is a blockchain system.

5. The method for confirming e-mail authenticity according to claim 1, wherein the authenticity verification procedure further comprises:
    performing text recognition on the edit mail window image acquired from the data storage device; and
    comparing a recognized text with the mail content of the e-mail, and marking the e-mail as counterfeit if the recognized text does not accord with the mail content.

6. A non-transitory storage medium enabling an electronic device to perform certain e-mail attestation and authenticity verification steps, wherein an electronic device is respectively disposed at a sender point and a receiver point, the electronic device at the sender point sends an e-mail to the electronic device at the receiver point, the electronic device at the receiver point opens the e-mail, the e-mail attestation and authenticity verification steps are performed when the sender sends the e-mail and the receiver point opens the e-mail, and the e-mail attestation and authenticity verification steps comprise:
    performing an attestation procedure at the sender point and then sending the e-mail to the receiver, the attestation procedure comprising:
        producing a data fingerprint based on mail content of the e-mail;
        inserting the data fingerprint into the e-mail;
        transmitting the data fingerprint and the mail content to a data storage device to be stored;
        taking a screenshot of an edit mail window of the e-mail to acquire an edit mail window image comprising at least part of the mail content; and
        transmitting the edit mail window image to the data storage device to be stored; and
    performing an authenticity verification procedure when the receiver point receives the e-mail, the authenticity verification procedure comprising:
        obtaining the data fingerprint from the e-mail;
        acquiring, based on the data fingerprint, the corresponding mail content from the data storage device;
        marking the e-mail as counterfeit if the corresponding mail content is not stored in the data storage device or the acquired mail content does not accord with the mail content of the received e-mail;

acquiring, based on the data fingerprint, the corresponding edit mail window image from the data storage device; and displaying the edit mail window image acquired from the data storage device.

7. A system for confirming e-mail authenticity, comprising:

a data storage device;

a sender electronic device, producing a data fingerprint based on mail content of an e-mail, inserting the data fingerprint into the e-mail, transmitting the data fingerprint and the mail content to the data storage device to be stored, taking a screenshot of an edit mail window of the e-mail to acquire an edit mail window image comprising at least part of the mail content, and transmitting the edit mail window image to the data storage device to be stored; and a receiver electronic device, obtaining the data fingerprint from the e-mail, acquiring, based on the data fingerprint, the corresponding mail content from the data storage device, marking the e-mail as counterfeit if the corresponding mail content is not stored in the data storage device or the acquired mail content does not accord with the mail content of the received e-mail, acquiring, based on the data fingerprint, the corresponding edit mail window image from the data storage device; and displaying the edit mail window image acquired from the data storage device.

* * * * *